United States Patent [19]

Uretsky et al.

[11] Patent Number: 4,493,213
[45] Date of Patent: Jan. 15, 1985

[54] RANDOM VIBRATIONS TESTING DEVICE

[75] Inventors: Yan S. Uretsky; Ravil V. Mnekin, both of Kazan; Viktor G. Rygalin, Moscow; Dmitry A. Grechinsky, Moscow; Viktor A. Klochko, Moscow, all of U.S.S.R.

[73] Assignees: Nauchno-Issledovatelsky Institut Introskopii; Kazansky Aviatsionny Institut Imeni A. N Tupoleva, both of U.S.S.R.

[21] Appl. No.: 439,618

[22] Filed: Nov. 5, 1982

[51] Int. Cl.³ .............................................. G01M 7/00
[52] U.S. Cl. ...................................................... 73/664
[58] Field of Search ........................ 73/664; 331/78; 328/143

[56] References Cited

U.S. PATENT DOCUMENTS 3,316,491  4/1967  Berman et al. ...................... 328/127
3,323,068  5/1967  Woods ................................... 328/61
3,404,561  10/1968  Ratz ..................................... 73/664

FOREIGN PATENT DOCUMENTS 393631  12/1973  U.S.S.R. .

OTHER PUBLICATIONS

Bozhko A. Ye and Uretsky Ya. S., "Random Vibrations Spectrum Forming Systems", 1979, p. 62, FIG. 17.
Kliuev V. V., "Devices and Systems for Measurements of Vibration, Noise and Impacts", 1978, p. 317.

Primary Examiner—James J. Gill
Attorney, Agent, or Firm—Steinberg & Raskin

[57] ABSTRACT

A random vibrations testing device comprising a noise generator the output whereof is connected to an input of a wide-band filter. An output of the wide-band filter is connected directly and through paralleled narrow-band in-phase signal shaping channels to a means for shaping dips and spikes in the spectrum of a signal being shaped, which is electrically coupled with narrow-band opposite-phase signal shaping channels. The means for shaping the spikes and dips in the shaped signal spectrum is devised in the form of an adder series-connected to the wide-band filter, used commonly by all the narrow-band in-phase signal shaping channels and serving to form spikes in the shaped signal spectrum, and adders also series-connected to said wide-band filter, used individually by each opposite-phase narrow-band signal shaping channel and serving to form dips in the shaped signal spectrum.

2 Claims, 8 Drawing Figures

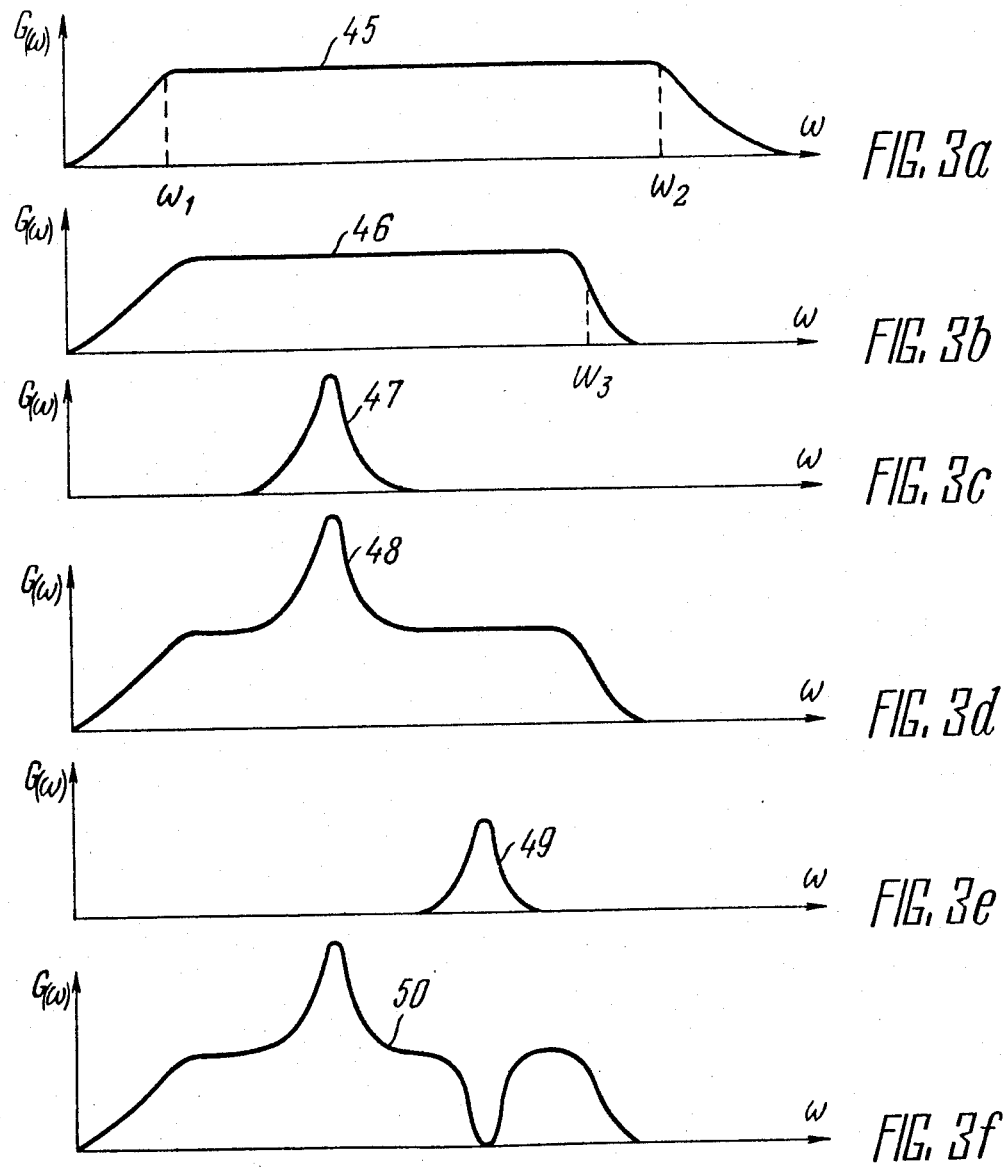

RANDOM VIBRATIONS TESTING DEVICE

FIELD OF THE INVENTION

The present invention relates to devices for testing various articles for resistance to mechanical effects and, more specifically, to vibration testing devices, such as those serving to test articles for resistance to random vibratory actions.

The random vibrations testing device can most advantageously be used in trying out various articles acted upon by random vibrations for producing such vibrations in a predetermined spectrum and for correcting the vibrator amplitude response.

BACKGROUND OF THE INVENTION

Known in the art is a random vibrations testing device comprising a noise generator, the output whereof is connected to paralleled narrow-band signal shaping channels, each of them incorporating a narrow-band amplification filter, the output whereof is connected to an input of a phase inverter paralleled with a switch, the output whereof is in its turn connected to an adder used commonly by all the shaping channels (cf. "Random Vibrations Spectrum Forming Systems" (in Russian) by Bozhko A.Ye. and Uretskiy Ya.S. Kiev, Naukova Dumka Publishing House, 1979, p. 62, FIG. 17).

Since a single adder is used in said device, the class of random vibration spectra being formed is narrow, the number of amplification narrow-band filters is large, and deep high-quality dips cannot be produced in the shaped signal spectrum.

There is also known a device proposed for testing articles acted upon by random vibrations, comprising a noise generator, the output whereof is connected to an input of a wide-band filter wherein an output is connected directly and through paralleled narrow-band in-phase signal shaping channels, each comprising a first pair of contacts of a switch, a narrow-band amplification filter, an attenuator and a second pair of contacts of the switch, to a means serving to form spikes and dips in the shaped signal spectrum and electrically coupled with opposite-phase narrow-band signal channels, each of them incorporating series-connected components including a pair of contacts of the same switch, the same narrow-band amplification filter, the same attenuator, a phase inverter, and a fourth pair of contacts of the same switch (cf. USSR Inventor's Certificate No. 393,631, class G01M 7/00).

An output of the switch in the foregoing device is connected to a power amplifier.

The means for formation of spikes and dips in the shaped signal spectrum of the device according to the invention is designed in the form of a single adder incorporating several inputs. Since the device is equipped with a wide-band filter connected to an input of the means for forming spikes and dips in the shaped signal spectrum, and is provided with narrow-band switching amplification filters, the number of narrow-band amplification filters can be reduced, and a more irregular random signal spectrum can be produced due to opposite-phase addition of the signals by the adder incorporated in the means for forming spikes and dips in the shaped signal spectrum.

Since several dips and spikes must be formed in the shaped signal spectrum, the device according to the invention is to be equipped with several narrow-band amplification filters connected directly or through phase inverters to the adder of the means for forming spikes and dips in the shaped signal spectrum.

The above method of connection of the narrow-band amplification filters does not provide for ideal amplitude response characteristics, and does not therefore permit producing deep dips in the shaped signal spectrum reaching zero level on frequencies corresponding to the center frequencies of said amplification filters.

SUMMARY OF THE INVENTION

It is a principal object of the present invention to increase the depth of dips in the shaped signal spectrum.

With these and other objects in view, a random vibrations testing device is provided comprising a noise generator, the output of which is connected to an input of a wide-band filter wherein an output is connected directly and through paralleled in-phase narrow-band signal shaping channels, each incorporating series-connected components, including a first pair of contacts of a switch, a narrow-band amplification filter, an attenuator and a second pair of contacts of said switch, to a means for shaping spikes and dips in a spectrum of signals being shaped, electrically coupled with opposite-phase narrow-band signal shaping channels, each incorporating series-connected components, including a third pair of contacts of the same switch, the same narrow-band amplification filter, the same attenuator, a phase inverter and a fourth pair of contacts of the same switch, wherein, according to the invention, the means for shaping spikes and dips in the shaped signal spectrum is an adder series-connected to the wide-band filter, used commonly by all the narrow-band in-phase signal shaping channels and serving to form spikes in the shaped signal spectrum, with the remaining inputs thereof connected to a second pair of contacts of said switch, and adders also connected in series to the wide-band filter, used individually by each narrow-band opposite-phase signal shaping channel and serving for shaping dips in the shaped signal spectrum, with an output of said common spike-shaping adder connected to a third pair of contacts of the switch, associated with the first narrow-band opposite-phase signal shaping channel, with outputs of the individual adders, excluding the last one, connected respectively to third pairs of the switch, associated with the narrow-band opposite-phase signal shaping channels, excluding the first one, and with the remaining inputs of the individual adders connected to fourth pairs of contacts of the switch, associated with their individual narrow-band opposite-phase shaping channels.

The random vibrations testing device of the present invention permits increasing the depth of dips in the shaped signal spectrum even to zero level on all the required frequencies.

BRIEF DESCRIPTION OF DRAWINGS

For a fuller understanding of the invention, reference is had to the following description, taken in connection with the accompanying drawings, in which:

FIGS. 3 a, b, c, d, e and f show signal spectra illustrating the operation of the device of FIGS. 1 and 2.

DESCRIPTION OF PREFERRED EMBODIMENTS

Figure 1:
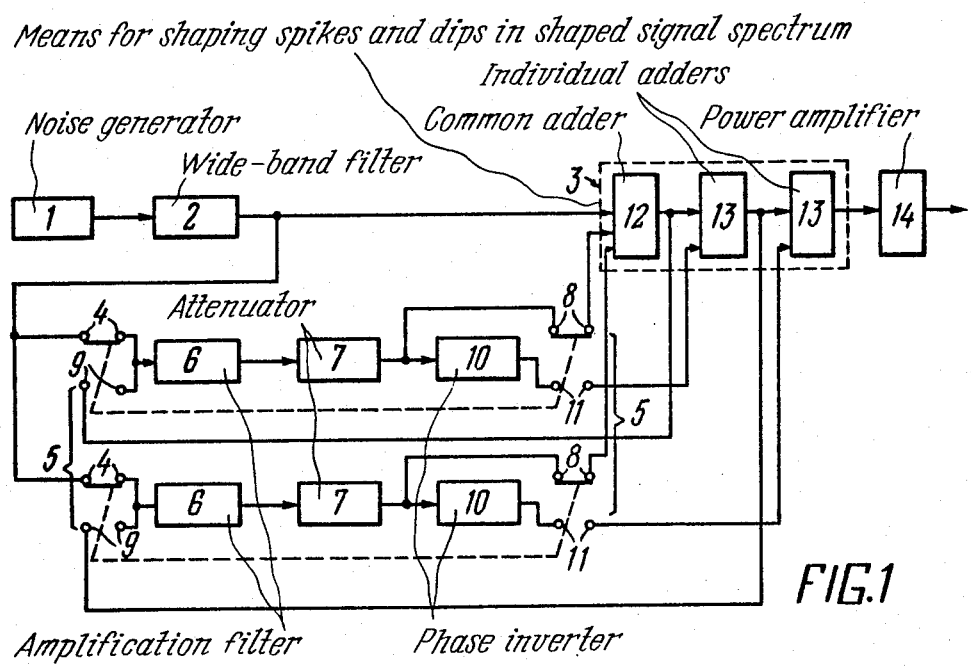
FIG. 1 is a block diagram of an embodiment of the random vibrations testing device of the invention.

The random vibrations testing device of the present invention comprises a noise generator 1 (FIG. 1) serving to generate a random wide-band signal characterized by an even energy spectrum in an operating frequency range, and incorporating an output connected to an input of a wide-band filter 2 serving to form a central level of random signal spectrum. An output of the wide-band filter 2 is connected directly or through paralleled narrow-band in-phase signal shaping channels to a means 3 serving to shape spikes and dips in the shaped signal spectrum, and coupled electrically with narrow-band opposite-phase signal shaping channels.

Each narrow-band in-phase signal shaping channel incorporates series-connected components, including a first pair 4 of contacts of a switch 5, connected to an output of the wide-band filter 2, an amplification filter 6, an attenuator 7, and a second pair 8 of contacts of the switch 5, connected to a respective input of the means 3 serving to shape spikes and dips in the shaped signal spectrum. The switch 5 is a manually-operated pushbutton switch.

Each narrow-band opposite-phase signal shaping channel comprises series-connected components, including a third pair 9 of contacts of the switch 5, the narrow-band amplification filter 6, the attenuator 7, a phase inverter 10, and a fourth pair 11 of contacts of the switch 5. Contacts 4, 8, 9 and 11 of the switch 5 are mechanically interconnected.

In one position of the pushbutton switch 5, when the pushbutton is released, the switch contacts 4 and 8 are closed and a signal from the noise generator 1 is fed through the wide-band filter 2 and such switch contacts 4 to the inputs of the narrow-band amplification filters 6. The output signals of the attenuators 7 are applied via the closed switch contacts 8 to the inputs of a first adder 12, in common for all the narrow-band in-phase signal shaping channels. The "spikes" of the energy spectrum (FIG. 3d) are shaped while the switch contacts 4 and 8 are closed.

When the pushbutton of the switch 5 is pressed, the switch contacts 9 and 11 are closed.

The means 3 serving to shape spikes and dips in the shaped signal spectrum is devised in the form of an adder 12 series-connected to a wide-band filter 2, used commonly by all the narrow-band in-phase signal shaping channels and serving to shape spikes in the shaped signal spectrum, and adders 13 also connected in series to said wide-band filter, used individually by each opposite-phase narrow-band signal shaping channel, and serving to shape dips in the shaped signal spectrum. An output of the spike shaping adder 12 is connected to the third pair 9 of contacts of the switch 5, associated with the first narrow-band opposite-phase signal shaping channel. An output of the first adder 13 for shaping of dips is connected to the third pair 9 of contacts of the switch 5 associated with the next second narrow-band opposite-phase signal shaping channel. Remaining inputs of the dip shaping adders 13 are connected to the fourth pair 11 of contacts of the switch 5, associated with their individual narrow-band opposite-phase signal shaping channel.

When the pushbutton of the switch 5 is pressed, so that the switch contacts 9 and 11 are closed, signals from the noise generator 1 are fed through the wide-band filter 2 the common adder 12 and the closed switch contacts 9 simultaneously to the inputs of the narrow-band amplification filters 6 and to the first inputs of corresponding individual adders 13. Inverted signals are applied via the closed switch contacts 11 to the second inputs of the adders 13 from the outputs of the phase inverters 10. The "dips" are thus shaped in the energy spectrum.

An output of the last adder 13 is connected to a power amplifier 14 used generally in modern devices (cf. "Devices and System for Measurements of Vibration, Noise and Impacts" (in Russian), a guide of two books, book 2, edited by Kliuev V. V., Moscow, Mashinostroyenie Publishing House, 1978, p. 317). An output of the amplifier 14 is connected to an input of a vibrator (not shown in the drawings as it is not a subject of the invention).

The embodiment of the present invention described above comprises two narrow-band opposite-phase shaping channels. However, the number of said channels may be increased, along with the number of the individual adders serving to shape dips in the shaped signal spectrum. In this case, the outputs of said individual adders, excluding the last one, will be connected respectively to the third pairs of switch contacts associated with the narrow-band opposite-phase signal shaping channels, excluding the first one.

Figure 2:
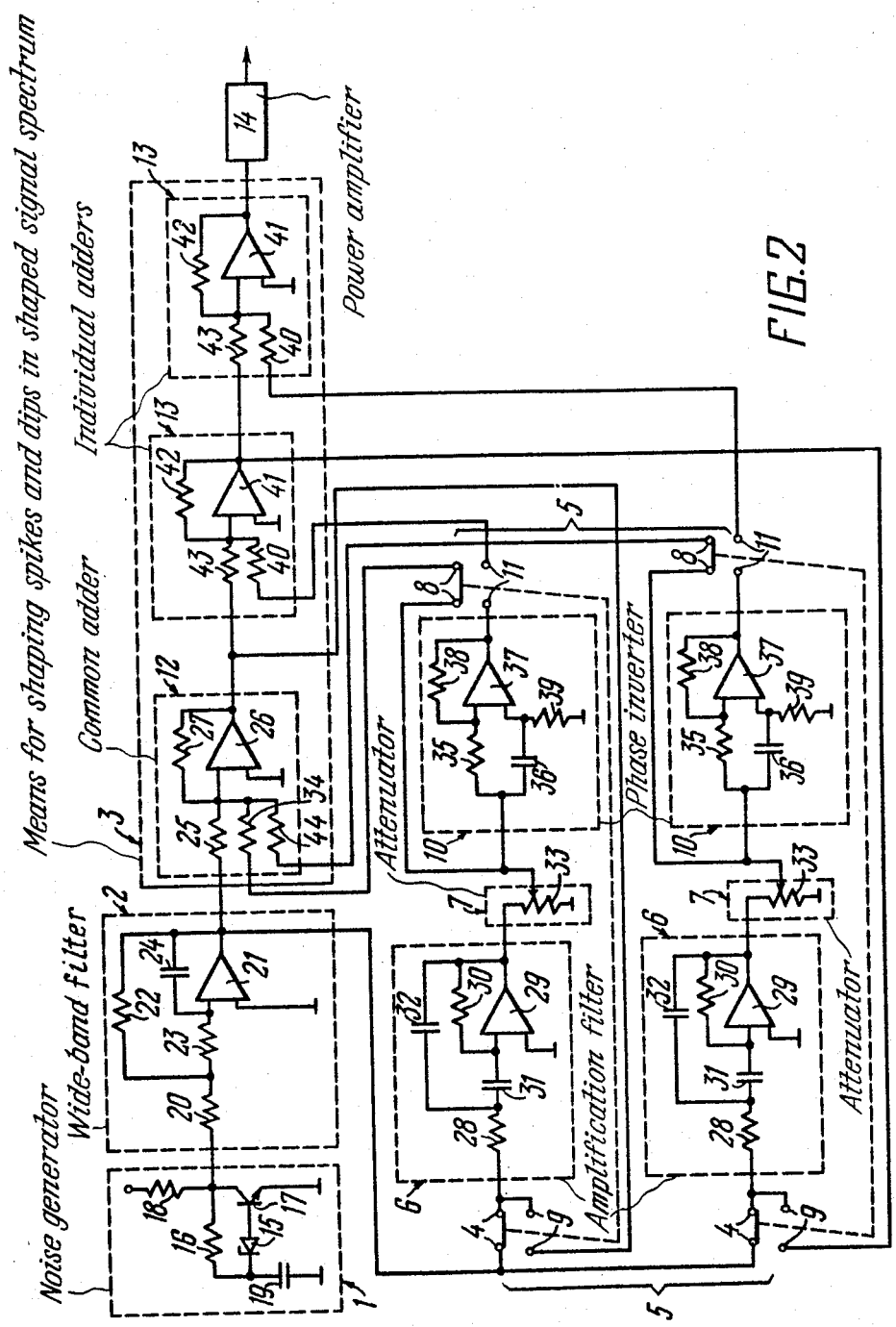
FIG. 2 is a circuit diagram of the embodiment of FIG. 1.

FIG. 2 is a circuit diagram of the random vibrations testing device of the embodiment of FIG. 1.

The noise generator 1 comprises a stabilizer diode 15 operating as a primary noise source under avalanche break-down conditions. These conditions are provided by a resistor 16 inserted between a cathode of the stabilizer diode 15 and a collector of a transistor 17 constituting an amplifier circuit including a resistor 18 connected by one lead thereof to the collector of the transistor 17. A capacitor 19 is included to control the bottom frequency in the generated noise spectrum. Another lead of the resistor 18 is connected to a power source (not shown in the drawing).

An output of the amplifier is applied to an input of the wide-band filter 2; more particularly, to an input resistor 20. The wide-band filter 2 is hooked around an operational amplifier 21. The input resistor 20 and resistors 22 and 23, and a capacitor 24 control the cut-off frequency of the wide-band filter 2.

An output of the operational amplifier 21 is connected to a resistor 25 at a first input of the common adder 12 using an operational amplifier 26, the feedback circuit whereof includes a resistor 27, and is connected through the first pair of contacts 4 of the switch 5 to an input resistor 28 of the narrow-band amplification filter 6 included into the narrow-band in-phase signal shaping channel and hooked around an operational amplifier 29. Resistors 28 and 30, and capacitors 31 and 32 control the center frequency of the narrow-band amplification filter 6, the Q-factor whereof depends on the gain factor of the operational amplifier 29, in addition to the above-mentioned circuit components, with an output of said amplifier connected to a potentiometer 33 of an attenuator 7. A movable contact of the potentiometer 33 is connected through the second pair of contacts 8 the switch 5 to the second input, of the common adder 12, more particularly, to a resistor 34, and to a paralleled resistor 35 and capacitor 36 of the phase inverter 10 in the narrow-band opposite-phase signal shaping channel.

The phase inverter 10 uses an operational amplifier 37, the feedback circuit whereof includes a resistor 38.

A resistor 39 and a capacitor 36 form a phase-inverting circuit.

An output of the operational amplifier 37 is connected through the fourth pair 11 of contacts of the switch 5 to an input resistor 40 of the individual adder 13 using an operational amplifier 41, the feedback circuit of which includes a resistor 42. An output of the operational amplifier 26 of the common adder 12 is connected to an input resistor 43 of the individual adder 13, and to the third pair 9 of contacts of the switch 5, associated with the first narrow-band opposite-phase signal shaping channel.

The third input of the adder 12, more particularly, a resistor 44, is connected to the second pair of contacts 8 of the switch 5 in the second narrow-band in-phase signal shaping channel.

An output of the operational amplifier 41 is connected to the third pair of contacts 9 of the switch 5, associated with the next narrow-band opposite-phase signal shaping channel, and to the input resistor 43 of the next individual adder 13, the second input resistor 40 whereof is connected to the fourth pair of contacts 11 of the switch 5 in its individual narrow-band opposite-phase signal shaping channel.

To illustrate the operating principle of the random vibrations testing device of the present invention, signal spectra are shown in FIG. 3, wherein the abscissa represents the frequency ($\omega$) and the ordinate represents the signal spectra G ($\omega$).

FIG. 3a shows a spectrum 45 of the signal at the output of the noise generator 1, FIG. 3b shows a spectrum 46 of the signal at the output of the wide-band filter 2, FIG. 3c shows a spectrum 47 of the narrow-band signal at the narrow-band in-phase signal shaping channel output, FIG. 3d shows a spectrum 48 of the signal at the output of the common adder 12, FIG. 3e shows a spectrum 49 of the narrow-band signal at the narrow-band opposite-phase signal shaping channel output, and FIG. 3f shows a spectrum 50 of the wide-band signal at the output of the individual adder 13.

The random vibrations testing device of the present invention operates as follows.

The wide-band random signal with the spectrum 45 shown in FIG. 3a is supplied to the input resistor 20 of the wide-band filter 2, with the spectrum 45 evenly distributed in a frequency range ($\omega_1$ to $\omega_2$), where $\omega_1$ and $\omega_2$ are the bottom and top frequencies, respectively, in the spectrum of the shaped signal derived from the output of the noise generator 1 (FIG. 2), that is, from the collector of the transistor 17. A cut-off frequency $\omega_3$ (FIG. 3b) of the wide-band filter 2 (FIG. 2) depending on the resistances of the resistors 20, 22 and 23, and on the capacitance of the capacitor 24, is located on the frequency axis below the top frequency $\omega_2$ (FIG. 3a) of the spectrum 45 of the wide-band random signal. Therefore, the spectrum 46 (FIG. 3b) at the output of the wide-band filter 2 (FIG. 2), that is, at the output of the operational amplifier 21, will be cut off steeply on the frequency $\omega_3$. The cut-off frequency $\omega_3$ determines the top frequency of the signal at the random vibrations testing device output according to the invention.

The wide-band random signal obtained from the output of the operational amplifier 21 (FIG. 2) is applied to one input of the common adder 12 (i.e., to the resistor 25) and to the first pair of contacts 4 of the switch 5. After the first pair of contacts 4 are closed, the wide-band random signal is sent through said first pair of contacts to the input of the narrow-band in-phase signal shaping channel, more particularly, to the input resistor 28 of the narrow-band amplification filter 6, which puts out a narrow-band signal. The spectrum 47 (FIG. 3c) of this signal depends on the center frequency and on the bandwidth of the narrow-band amplification filter 6 (FIG. 2).

The signal fed from the output of the narrow-band amplification filter 6 is injected into the attenuator 7, the output signal level of which depends on positioning of a wiper in the potentiometer 33. The signal picked off from the wiper of the potentiometer 33 is supplied to the input of the phase inverter 10 and to the second pair of contacts 8 of the switch 5, which close and send the narrow-band signal to the second input of the adder 12; more particularly, to the resistor 34. Since the wide-band random signal applied to the resistor 25 of the common adder 12, and narrow-band random signal applied to the other resistor 34 are in phase, the common adder 12 sums the two signals, with the result that the operational amplifier 26 of the common adder 12 puts out a signal with the spectrum 48 (FIG. 3d).

After the third pair of contacts 9 (FIG. 2) of the switch 5 are closed, the wide-band random signal obtained from the output of the common adder 12 more particularly, from the operational amplifier 26 is forwarded through said third pair of contacts to the input of the first narrow-band opposite-phase signal shaping channel, more particularly, to the input resistor 28 of the narrow-band amplification filter 6. The narrow-band opposite-phase signal shaping channel employs the same narrow-band amplification filter 6 and the same attenuator 7.

The narrow-band signal shaped at the output of the attenuator 7 may be characterized by the spectrum 49 (FIG. 3e) differing from the spectrum 47 (FIG. 3c), depending on the resistance of the resistors 28 and 30, and capacitance of the capacitors 31 and 32, and on the position of the wiper in the potentiometer 33. The narrow-band signal obtained from the output of the attenuator 7 (FIG. 2) is applied to the input of the phase inverter 10 which puts out a narrow-band signal with an opposite phase. The opposite-phase signal supplied from the output of the phase inverter 10 through the fourth pair of contacts 11 of the switch 5 is applied to one input, more particularly, the resistor 40 of the individual adder 13, the other input of which, more particularly, the resistor 43 is fed with the wide-band random signal provided at the output of the common adder 12. Since the two signals are in phase opposition, the individual adder 13 subtracts them, with the result that the individual adder 13 puts out a wide-band random signal with the spectrum 50 (FIG. 3f).

The random vibrations testing device of the invention permits extending the dynamic range of the irregularities shaped in the simulated vibration spectrum by forming deeper dips in the signal spectrum. Besides, the device contributes to improved isolation of the narrow-band opposite-phase signal shaping channels, and, thus, to easier adjustment of said channels for the desired spectrum of vibrations.

The device of the present invention also permits improving the validity of trials conducted for estimation of the effects of random vibrations, and thereby cuts down the costs of such trials.

In describing the preferred embodiment of the present invention, specific terminology was resorted to for the sake of clarity. However, it is not intended to be limited to the specific terms so selected, and it is to be understood that each specific term includes all technical equivalents which operate in a similar manner to accomplish a similar purpose.

Though the invention has been described herein in connection with the preferred embodiment thereof, it is to be understood that variations and modifications may be made without departing from the spirit and scope of the invention as those skilled in the art will readily understand.

Such alterations and modifications are to be considered as falling within the spirit and scope of the invention and the appended claims.

What is claimed is:

1. A random vibrations testing device, comprising:
    a noise generator having an output;
    a wide-band filter having an output and an input connected to the output of said noise generator;
    a switch having a first pair of switch contacts and a second pair of switch contacts;
    narrow-band in-phase signal shaping channels connected in parallel to the output of said wide-band filter, each of said channels comprising said first pair of switch contacts connected to the output of said wide-band filter, a narrow-band amplification filter connected in series with said first pair of switch contacts, an attenuator connected in series with said narrow-band amplification filter, and said second pair of switch contacts connected in series with said attenuator; and
    means for shaping spikes and dips in a shaped signal spectrum, said means being connected to the output of said wide-band filter and to said narrow-band in-phase signal shaping channels, said means including a common adder connected in common to said narrow-band in-phase signal shaping channels, said common adder shaping spikes in the shaped signal spectrum and having an output, one input connected to the output of said wide-band filter, and additional inputs respectively connected to said second pair of switch contacts of said channels, and additional individual adders for shaping dips in the shaped signal spectrum, each of said additional adders having an output and inputs, an input of a first said additional adders being connected to the output of said common adder, and the output of each of said additional adders, excluding the first of said additional adders, being connected to one of the inputs of the next-adjacent one of said additional adders.

2. A random vibrations testing device as claims in claim 1, wherein said switch has a third pair of switch contacts and a fourth pair of switch contact, and said narrow-band opposite-phase signal shaping channels are equal in number to said additional individual adders, each of said channels comprising said third pair of switch contacts, said narrow-band amplification filter connected in series with said third pair of switch contacts, an attenuator connected in series with said narrow-band amplification filter, a phase inverter connected in series with said attenuator, and said fourth pair of switch contacts connected in series with said phase inverter and connected to another input of the additional adder corresponding to its narrow-band opposite-phase signal shaping channel, the third pair of switch contacts of one of said signal shaping channels being connected to the output of said common adder, and the third pair of switch contacts of the others of said narrow-band opposite-phase signal shaping channels being connected to the outputs of said additional adders.

* * * * *